US007805286B2

(12) United States Patent
Jorgensen et al.

(10) Patent No.: US 7,805,286 B2
(45) Date of Patent: Sep. 28, 2010

(54) SYSTEM AND METHOD FOR SOUND SYSTEM SIMULATION

(75) Inventors: Morten Jorgensen, Southborough, MA (US); Christopher B. Ickler, Sudbury, MA (US); Michael C. Monks, Concord, MA (US)

(73) Assignee: Bose Corporation, Framingham, MA (US)

( * ) Notice: Subject to any disclaimer, the term of this patent is extended or adjusted under 35 U.S.C. 154(b) by 466 days.

(21) Appl. No.: 11/948,160

(22) Filed: Nov. 30, 2007

(65) Prior Publication Data

US 2009/0144036 A1 Jun. 4, 2009

(51) Int. Cl.
*G06G 7/48* (2006.01)
*G06F 7/60* (2006.01)
*G06F 17/10* (2006.01)

(52) U.S. Cl. ............................... 703/7; 703/2; 702/195; 381/71.1; 381/79

(58) Field of Classification Search ..................... 703/7, 703/2; 702/195; 381/71.1, 79
See application file for complete search history.

(56) References Cited

U.S. PATENT DOCUMENTS

| | | | | |
|---|---|---|---|---|
| 5,467,401 | A * | 11/1995 | Nagamitsu et al. | 381/63 |
| 5,812,676 | A | 9/1998 | Johnson | |
| 6,895,378 | B1 | 5/2005 | Meyer et al. | |
| 7,069,219 | B2 | 6/2006 | Meyer et al. | |
| 7,096,169 | B2 * | 8/2006 | Crutchfield, Jr. | 703/7 |
| 2004/0086131 | A1 | 5/2004 | Ringlstetter et al. | |
| 2006/0078130 | A1 | 4/2006 | Jorgensen | |

FOREIGN PATENT DOCUMENTS

EP 1647909 4/2006

OTHER PUBLICATIONS

International Search Report and Written Opinion dated Apr. 29, 2009 for PCT/US2008/077630.

Kleiner m. et al., "Auralization—An Overview", Journal of the Audio Engineering Society, Audio Engineering Society, New York, NY, vol. 41, No. 11, Nov. 1, 1993, pp. 861-874.

Kleiner, et al.; Auralization: Experiments in Acoustical CAD, Chambers University of Technology, Audio Engineering Society 89th Convention, 1990.

Jacob, Kenneth D.; Development of a New Algorithm for Predicting the Speech Intelligibility of Sound Systems, Audio Engineering Society 83rd Convention, 1987.

Jacob, Kenneth D., et al.; Accurate Prediction of Speech Intelligibility without the Use if In-Room Measurements, J. Audio Eng. Soc., vol. 39, No. 4, (Apr. 1991), pp. 232-242.

(Continued)

*Primary Examiner*—Dwin M Craig

(57) ABSTRACT

A sound system design/simulation system includes background noise to provide more realistic sound renderings of the designed space and more accurate quality measures of the design space. The background noise may be provided as a library in the design system that allows the user to select a background noise profile. The user may also provide a recording of a background noise from the built space or from a similar space. The design system converts the recorded background noise to a background noise profile and adds the profile to the library of background noise profiles. The user can select a background noise profile and associate the profile with a specified space. The user can adjust the noise level of the background noise and the design system automatically updates one or more quality measures in response to the change in background noise level.

11 Claims, 10 Drawing Sheets

OTHER PUBLICATIONS

Jacob, Kenneth D.; Correlation of Speech Intelligibility Tests in Reverberant Rooms with Three Predictive Algorithms, J. Audio Eng. Soc., vol. 37, No. 12, (Dec. 1989), pp. 1020-1030.

Jorgensen, et al.; Judging the Speech Intelligibility of Large Rooms via Computerized Audible Simulations, Audio Engineering Society 91st Convention,1991.

International Standard, IEC 60268-16, Sound System Equipment, Part 16: Objective Rating of Speech Intelligility bybSpeech Transmission Index, International Electromechanical Commission, Third Edition, 2003.

Houtgast, et al.; Predicting Speech Intelligility in Rooms from the Modulation Transfer Function. I. General Room Acoustics, Acustica, vol. 46, No. 1, (1980), pp. 60-72.

Houtgast, T., et al.; Evaluation of Speech Transmission Channels by Using Artificial Signals, Acustica International Journal on Acoustics, 1971, pp. 355-367, vol. 25, Institute for Perception RVO-TNO, Soesterberg, The Netherlands.

International Preliminary Report on Patentability for PCT/US2008/077630, dated Jun. 10, 2010.

* cited by examiner

200

SYSTEM AND METHOD FOR SOUND SYSTEM SIMULATION

BACKGROUND

This disclosure relates to systems and methods for sound system design and simulation. As used herein, design system and simulation system are used interchangeably and refer to systems that allow a user to build a model of at least a portion of a venue, arrange sound system components around or within the venue, and calculate one or more measures characterizing an audio signal generated by the sound system components. The design system or simulation system may also simulate the audio signal generated by the sound system components thereby allowing the user to hear the audio simulation.

SUMMARY

A sound system design/simulation system includes background noise to provide more realistic sound renderings of the designed space and more accurate quality measures of the design space. The background noise may be provided as a library in the design system that allows the user to select a background noise profile. The user may also provide a recording of a background noise from the built space or from a similar space. The design system converts the recorded background noise to a background noise profile and adds the profile to the library of background noise profiles. The user can select a background noise profile and associate the profile with a specified space. The user can adjust the noise level of the background noise and the design system automatically updates one or more quality measures in response to the change in background noise level.

One embodiment of the present invention is directed to an audio simulation system comprising: a model manager configured to enable a user to build a 3-dimensional model of a venue and place and aim one or more loudspeakers in the model; an audio engine configured to estimate a coverage pattern in a portion of the venue based on at least one acoustic characteristic of a component of the model; and an audio player generating at least two acoustic signals simulating an audio program played over the one or more loudspeakers in the model, each of the at least two acoustic signals including an audio program signal and a background noise signal. In one aspect, the background noise signal is equalized to reduce linear distortions introduced by the audio player. Another aspect further comprises a background noise library, the library including at least one user-defined background noise file, the user-defined background noise file including a noise profile portion and a background noise signal representing acoustic signal of the background noise, the noise profile portion used by the audio engine to estimate a speech intelligibility coverage pattern, the background noise signal played by the audio player simulating a background noise. In a further aspect, the background noise signal is recorded at the venue modeled by the simulation system. In a further aspect, the background noise signal is recorded at a venue similar to the venue modeled by the simulation system. In a further aspect, a level of the background noise signal is adjusted independently of the level of the audio program signal. In a further aspect, the speech intelligibility coverage pattern is automatically updated to reflect the independently adjusted background noise signal relative to the audio program signal. Another aspect further comprises a profile editor configured to allow a user to graphically edit the noise profile portion of the user-defined background noise file.

Another embodiment of the present invention is directed to an audio simulation method comprising: providing an audio simulation system including a model manager, an audio engine, and an audio player; building a model of a venue in the audio simulation system, the model including a sound system; selecting a location in the model; and generating at least two acoustic signals simulating an audio program played over the sound system in the model at the selected location, each of the at least two acoustic signals including an audio program signal and a background noise signal. Another aspect further comprises selecting the background noise signal based on the venue. Another aspect further comprises adjusting the background noise signal independently of the audio program signal. Another aspect further comprises recording a background noise at an existing venue; equalizing the recorded background noise to reduce linear distortions introduced by the audio player; and saving the equalized background noise in a file, the file part of a library of background noise files selectable by the user. Another aspect further comprises editing the background noise signal.

Another embodiment of the present invention is directed to a computer-readable medium storing computer-executable instructions for performing a method comprising: providing an audio simulation system including a model manager, an audio engine, and an audio player; building a model of a venue in the audio simulation system, the model including a sound system; selecting a location in the model; and generating at least two acoustic signals simulating an audio program played over the sound system in the model at the selected location, each of the at least two acoustic signals including an audio program signal and a background noise signal.

DETAILED DESCRIPTION

Figure 1:
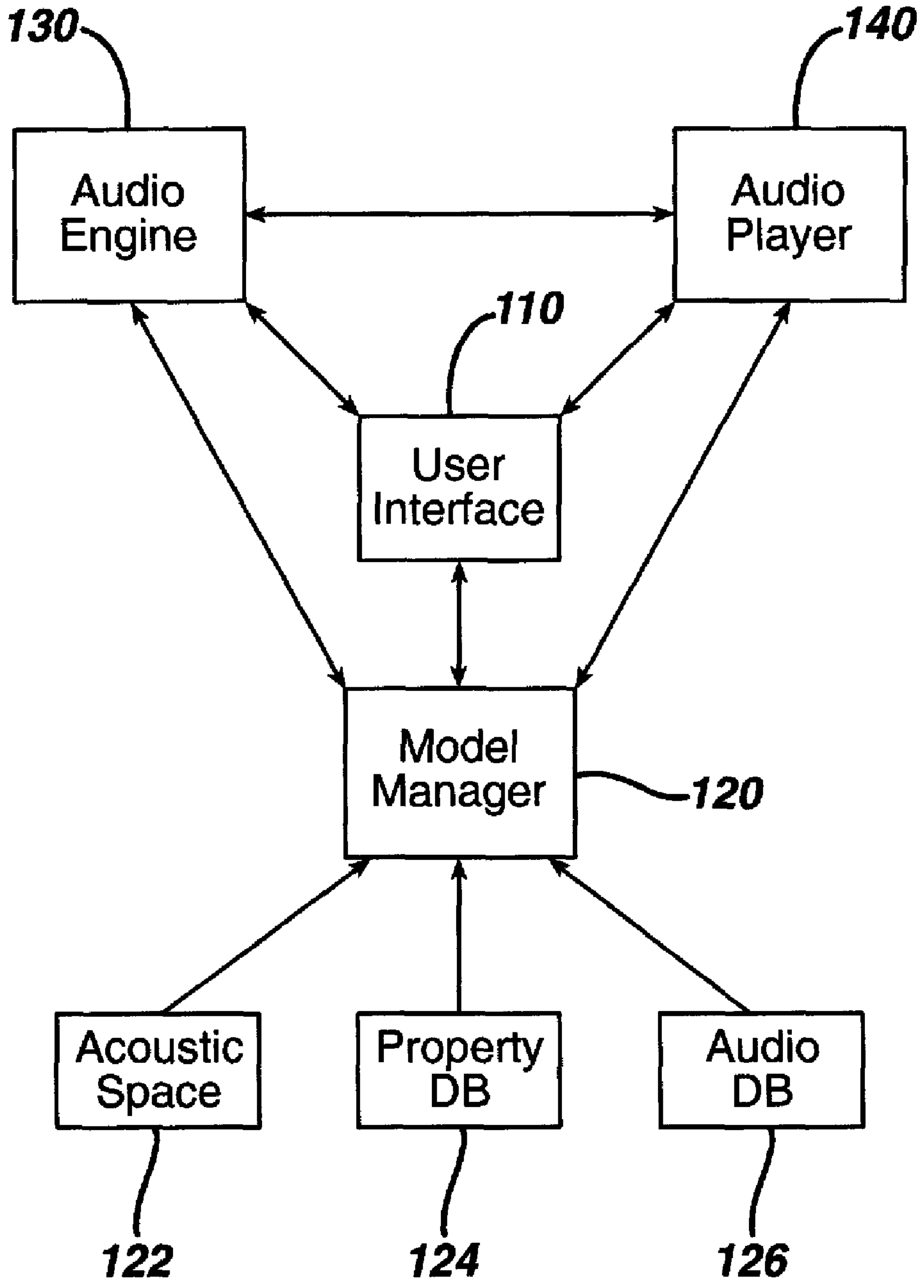
FIG. 1 is a diagram illustrating an architecture for an interactive sound system design system.

FIG. 1 illustrates an architecture for an interactive sound system design system. The design system includes a user interface 110, a model manager 120, an audio engine 130 and an audio player 140. The model manager 120 enables the user to build a 3-dimensional model of a venue, select venue surface materials, and place and aim one or more loudspeakers in the model. A property database 124 stores the acoustic properties of materials that may be used in the construction of the venue. An audio database 126 stores the acoustic properties of loudspeakers and other audio components that may be used as part of the designed sound system. Variables characterizing the venue or the acoustic space 122 such as, for example, temperature, humidity, background noise, and percent occupancy may be stored by the model manager 120. The user may select a background noise from a library of files representing different types of background noise. Each file in the library includes a noise profile characterizing the background noise in the frequency domain and an audio portion that may be played by the audio engine to simulate the background noise in the model.

The audio engine 130 estimates one or more sound qualities or sound measures of the venue based on the acoustic model of the venue managed by the model manager 120 and the placement of the audio components. The audio engine 130 may estimate the direct and/or indirect sound field coverage at any location in the venue and may generate one or more sound measures characterizing the modeled venue using methods and measures known in the acoustic arts.

The audio player 140 generates at least two acoustic signals that preferably give the user a realistic simulation of the designed sound system in the actual venue. The user may select an audio program that the audio player uses as a source input for generating the at least two acoustic signals that simulate what a listener in the venue would hear. The at least two acoustic signals may be generated by the audio player by filtering the selected audio program according to the predicted direct and reverberant characteristics of the modeled venue predicted by the audio engine. The audio player 140 allows the designer to hear how an audio program would sound in the venue, preferably before construction of the venue begins. In many instances, the human ear may be able to distinguish small and subtle differences in the sound field that may not be apparent in the sound field coverage maps generated by the audio engine 130. This allows the designer to make changes to the selection of materials and/or surfaces during the initial design phase of the venue where changes can be implemented at low cost relative to the cost of retrofitting these same changes after construction of the venue. The auralization of the modeled venue provided by the audio player also enables the client and designer to hear the effects of different sound systems in the venue and allows the client to justify, for example, a more expensive sound system when there is an audible difference between sound systems. An example of an audio player is described in U.S. Pat. No. 5,812,676 issued Sep. 22, 1998, herein incorporated by reference in its entirety.

Figure 10:
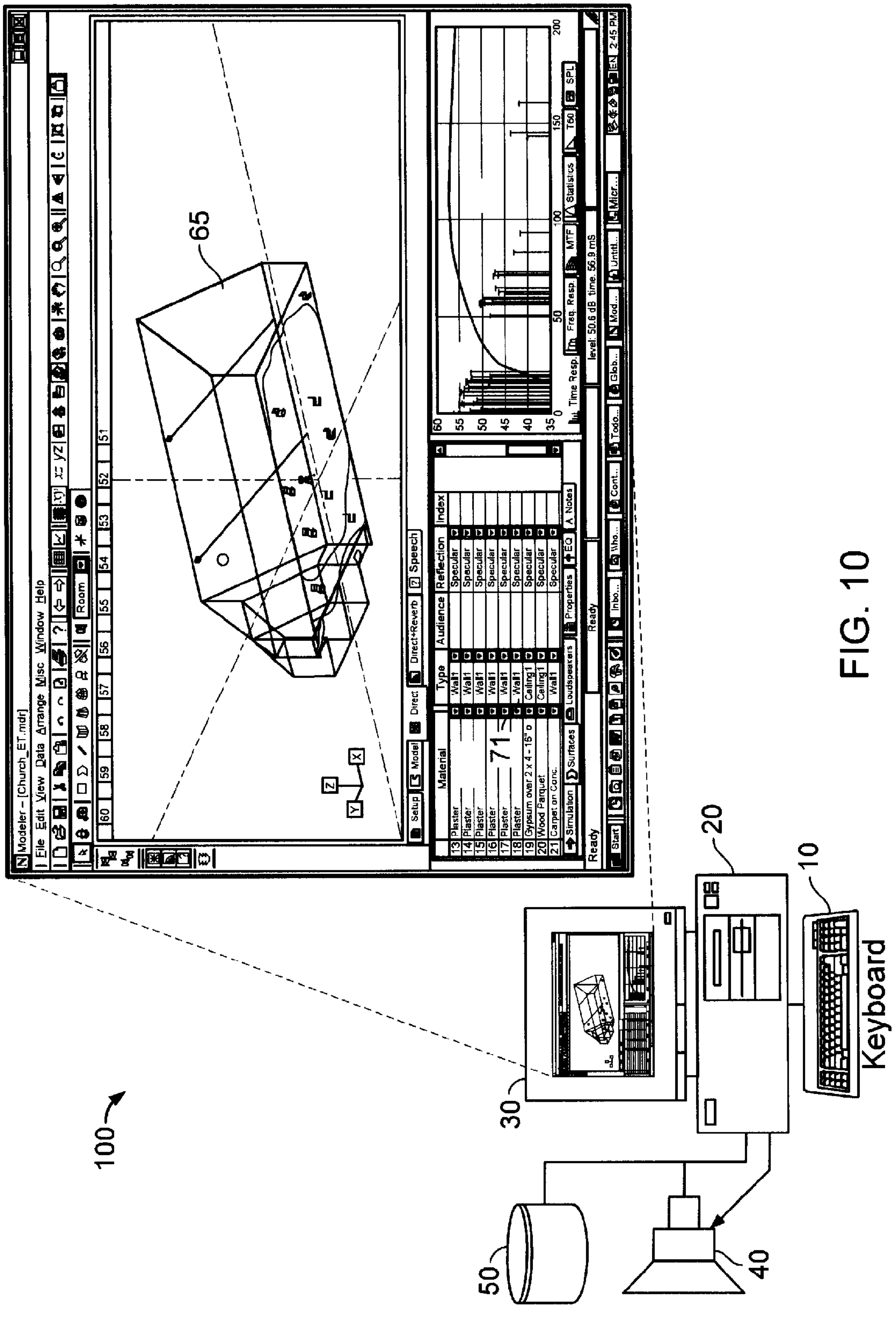
FIG. 10 shows a system 100 for designing audio systems.

Examples of interactive sound system design systems are described in co-pending U.S. patent application Ser. No. 10/964,421 filed Oct. 13, 2004, now U.S. Pat. No. 7,643,640, herein incorporated by reference in its entirety. As explained in that patent and shown in FIG. 10, a system 100 for designing audio systems includes an input mechanism 10, a processor 20 for processing user input received by the input mechanism 10, a display 30, a storage device 50 for storing sound system component 65 and component parameters 71 of the sound system components 65 (e.g. the sound system components 65 and component parameters 71 effectively serve as a specification of a sound system design) and an output device 40 for outputting at least one simulated audio signal. Procedures and methods used by the audio engine to calculate coverage, speech intelligibility, etc., may be found in, for example, K. Jacob et al., "*Accurate Prediction of Speech Intelligibility without the Use of In-Room Measurements*," J. Audio Eng. Soc., Vol. 39, No. 4, pp. 232-242 (April, 1991) and are herein incorporated by reference in their entirety. Auralization methods implemented by the audio player may be found in, for example, M. Kleiner et al., "*Auralization: Experiments in Acoustical CAD*," Audio Engineering Society Preprint #2990, September, 1990 and is herein incorporated by reference in its entirety.

Figure 2:
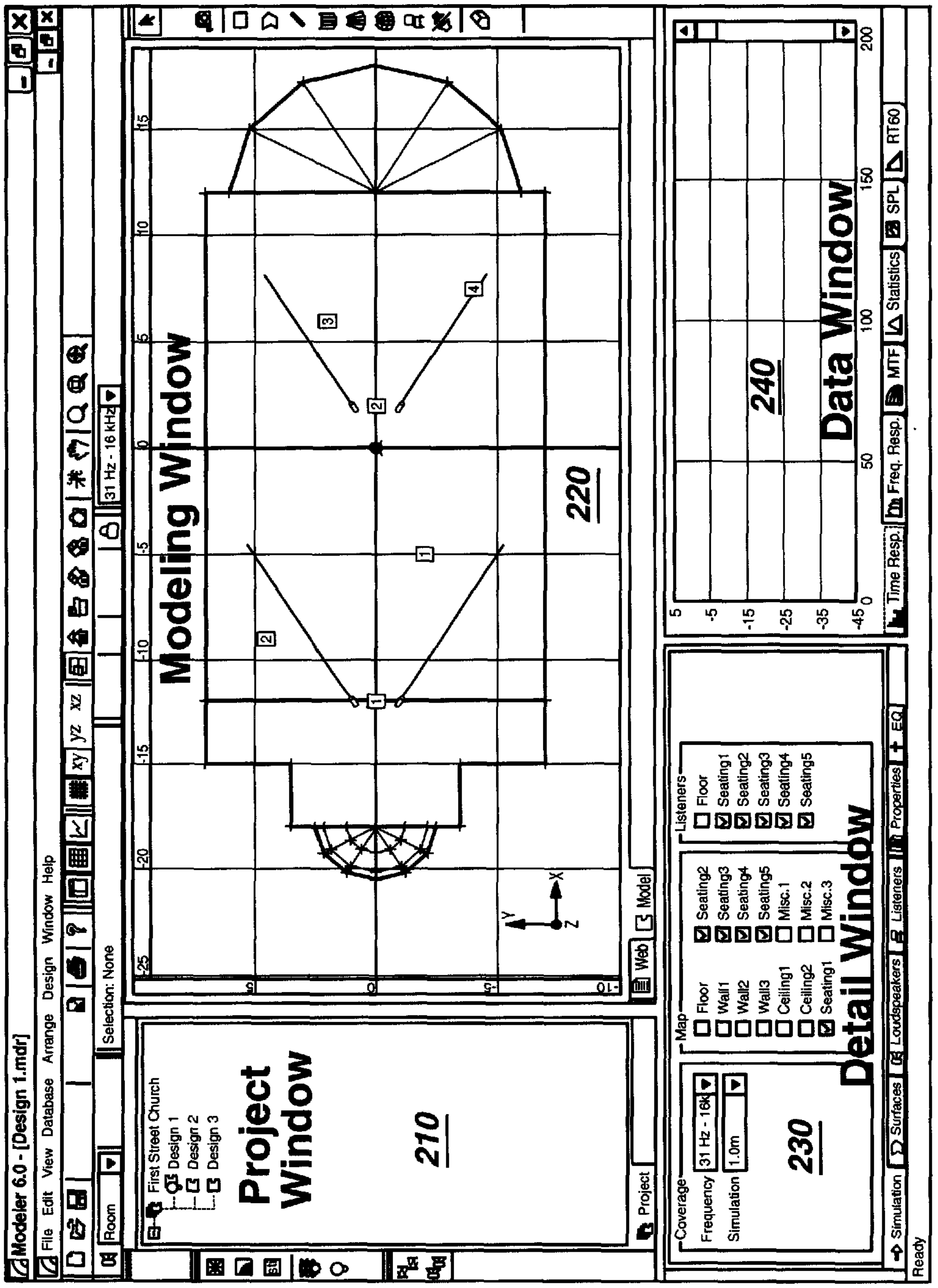
FIG. 2 illustrates a display portion of a user interface of the system shown in FIG. 1.

FIG. 2 illustrates a display portion of a user interface of the system shown in FIG. 1. In FIG. 2, the display 200 shows a project window 210, a modeling window 220, a detail window 230, and a data window 240. The project window 210 may be used to open existing design projects or start a new design project. The project window 210 may be closed to expand the modeling window 220 after a project is opened.

The modeling window 220, detail window 230, and the data window 240 simultaneously present different aspects of the design project to the user and are linked such that data changed in one window is automatically reflected in changes in the other windows. Each window can display different views characterizing an aspect of the project. The user can select a specific view by selecting a tab control associated with the specific view.

Figure 3:
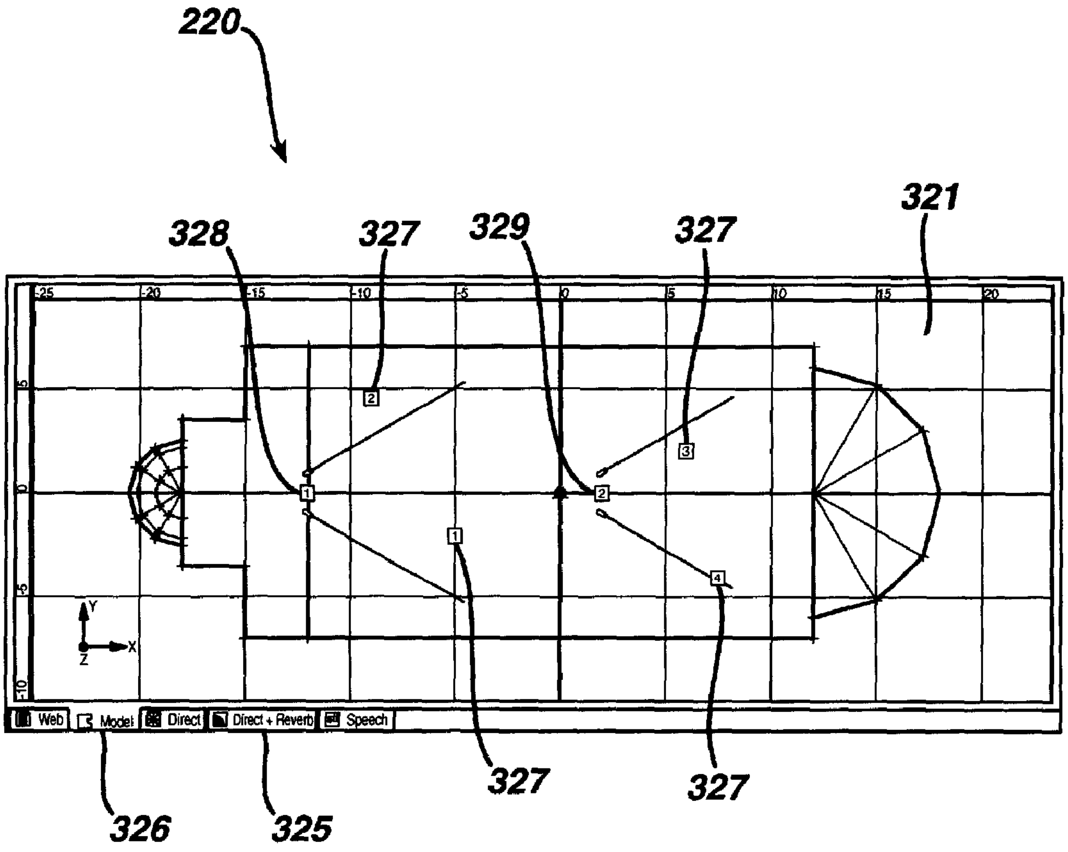
FIG. 3 illustrates a detailed view of a modeling window in the display portion of FIG. 2.

FIG. 3 illustrates an exemplar modeling window 220. In FIG. 3, control tabs 325 may include a Web tab, a Model tab, a Direct tab, a Direct+Reverb tab, and a Speech tab. The Web tab provides a portal for the user to access the Web to, for example, access plug-in software components or download updates from the Web. The Model tab enables the user to build and view a model. The model may be displayed in a 3-dimensional perspective view that can be rotated by the user. In FIG. 3, the model tab 326 has been selected and displays the model in a plan view in a display area 321 and shows the locations of user selectable speakers 328, 329 and listeners 327.

The Direct, Direct+Reverb, and Speech tabs estimate and display coverage patterns for the direct field, the direct+reverb field, and a speech intelligibility field. The coverage area may be selected by the user. The coverage patterns are preferably overlaid over a portion of the displayed model. The coverage patterns may be color-coded to indicate high and low areas of coverage or the uniformity of coverage. The direct field is estimated based on the SPL at a location generated by the direct signal from each of the speakers in the modeled venue. The direct+reverb field is estimated based on the SPL at a location generated by both the direct signal and the reflected signals from each of the speakers in the modeled venue. A statistical model of reverberation may be used to model the higher order reflections and may be incorporated into the estimated direct+reverb field. The speech intelligibility field displays the speech transmission index (STI) over the portion of the displayed model. The STI is described in K. D. Jacob et al., "Accurate Prediction of Speech Intelligibility without the Use of In-Room Measurements," J. Audio Eng. Soc., Vol. 39, No. 4, pp 232-242 (April, 1991), Houtgast, T. and Steeneken, H. J. M. "Evaluation of Speech Transmission Channels by Using Artificial Signals" Acoustica, Vol. 25, pp 355-367 (1971), "Predicting Speech Intelligibility in Rooms from the Modulation Transfer Function. I. General Room Acoustics," Acoustica, Vol. 46, pp 60-72 (1980) and the international standard "Sound System Equipment—Part 16: Objective Rating of Speech Intelligibility by Speech Transmission Index, IEC 60268-16, which are each incorporated herein in their entirety.

Figure 4:
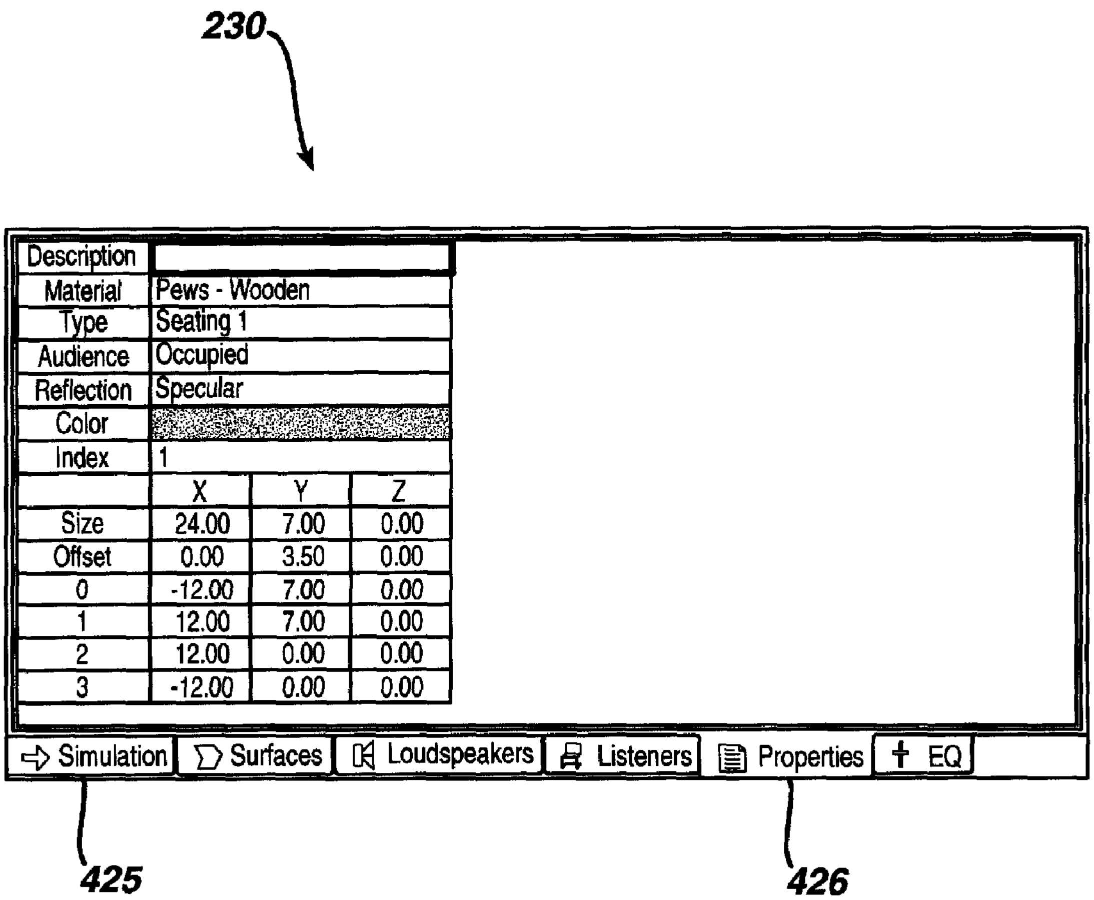
FIG. 4 illustrates a detailed view of a detail window in the display portion of FIG. 2.

FIG. 4 shows an exemplar detail window 230. In FIG. 4, the property tab 426 is shown selected. Other control tabs 425 may include a Simulation tab, a Surfaces tab, a Loudspeakers tab, a Listeners tab, and an EQ tab.

When the Simulation tab is selected, the detail window display one or more input controls that allow the user to specify a value or select from a list of values for a simulation parameter. Examples of simulation parameter include a frequency or frequency range encompassed by the coverage map, a resolution characterizing the granularity of the coverage map, and a bandwidth displayed in the coverage map. The user may also specify one or more surfaces in the model for display of the acoustic prediction data.

The Surfaces, Loudspeakers, and Listeners tab allows the user to view the properties of the surfaces, loudspeakers, and listeners, respectively, placed in the model and allows the user to quickly change one or more parameters characterizing a surface, loudspeaker or listener. The Properties tab allows the user to quickly view, edit, and modify a parameter characterizing an element such as a surface or loudspeaker in the model. A user may select an element in the modeling window and have the parameter values associated with that element displayed in the detail window. Changes made by the user in the detail window are reflected in an updated coverage map, for example, in the modeling window.

When selected, the EQ tab enables the user to specify an equalization curve for one or more selected loudspeakers. Each loudspeaker may have a different equalization curve assigned to the loudspeaker.

Figure 5:
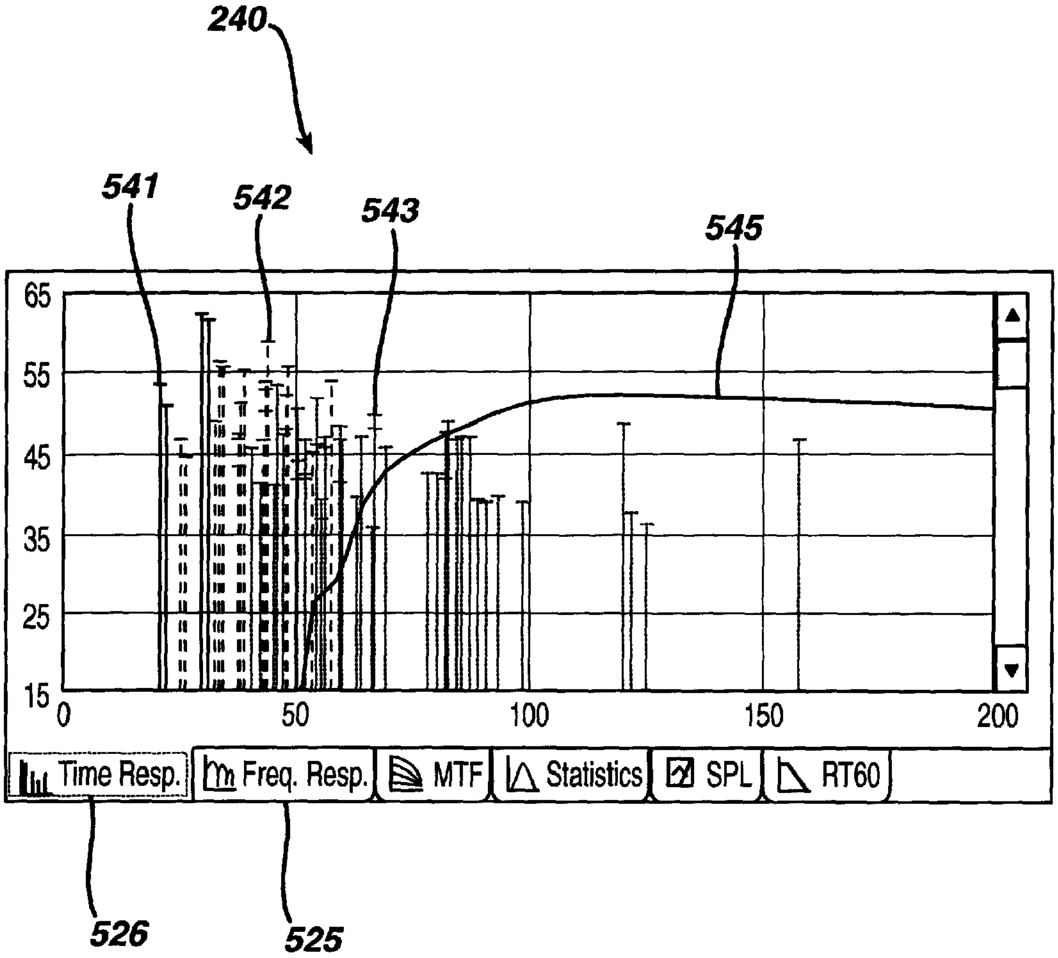
FIG. 5 illustrates a detailed view of a data window in the display portion of FIG. 2.

FIG. 5 shows an exemplar data window 240 with a Time Response tab 526 selected. Other control tabs 525 may include a Frequency Response tab, a Modulation Transfer Function (MTF) tab, a Statistics tab, a Sound Pressure Level (SPL) tab, and a Reverberation Time (RT60) tab. The Frequency Response tab displays the frequency response at a particular location selected by the user. The user may position a sample cursor in the coverage map displayed in the modeling window 220 and the frequency response at that location is displayed in the data window 240. The MTF tab displays a normalized amount of modulation preserved as a function of the frequency at a particular location selected by the user. The Statistics tab displays a histogram indicating the uniformity of the coverage data in the selected coverage map. The histogram preferably plots a normalized occurrence of a particular SPL against the SPL value. The mean and standard deviations may be displayed on the histogram as color-coded lines. The SPL tab displays the room frequency response as a function of frequency. A color-coded line representing the mean SPL at each frequency may be displayed in the data window along with color-coded lines representing a background noise level and/or a house curve, which represents the desired room frequency response. A shaded band may surround the mean SPL line to indicate a standard deviation from the mean. The RT60 tab displays the reverberation time as a function of frequency. The user may choose to display the average absorption data as a function of frequency instead of the reverberation time.

In FIG. 5, a time response plot is displayed in the data window 240. The time response plot shows a signal strength or SPL along the vertical axis, the elapsed time on the horizontal axis and indicates the arrival of acoustic signals at a user-selected location. The vertical spikes or pins shown in FIG. 5 represent an arrival of a signal at a sampling location from one of the loudspeakers in the design. The arrival may be a direct arrival 541 or an indirect arrival that has been reflected from one or more surfaces in the model. In a preferred embodiment, each pin may be color-coded to indicate a direct arrival, a first order arrival representing a signal that has been reflected from a single surface 542, a second order arrival representing a signal that has been reflected from two surfaces 543, and higher order arrivals. A reverberant field envelope 545 may be estimated and displayed in the time response plot. An example of how the reverberant field envelope may be estimated is described in K. D. Jacob, "Development of a New Algorithm for Predicting the Speech Intelligibility of Sound Systems," presented at the 83$^{rd}$ Convention of the Audio Engineering Society, New York, N.Y. (1987) and is incorporated herein in its entirety.

A user may select a pin shown in FIG. 5 and have the path of the selected pin displayed in the modeling window 220. The user may then make a modification to the design in the detail window 240 and see how the modification affects the coverage displayed in the modeling window 220 or how the modification affects a response in the data window. For example, a user can quickly and easily adjust a delay for a loudspeaker using a concurrent display of the modeling window 220, the data window 240, and the detail window 230. In this example, the user may adjust the delay for a loudspeaker to provide the correct localization for a listener located at the sample position. Listeners tend to localize sound based on the first arrival that they hear. If the listener is positioned closer to a second loudspeaker located farther away from an audio source than a first loudspeaker, they will tend to localize the source to the second loudspeaker and not to the audio source. If the second loudspeaker is delayed such that the audio signal from the second loudspeaker arrives after the audio signal from the first loudspeaker, the listener will be able to properly localize the sound.

The user can select the proper delays by displaying in the data window the direct arrivals in the time response plot. The user can select a pin representing one of the direct arrivals to identify the source of the selected direct arrival in the modeling window, which displays the path of the selected direct arrival from one of the loudspeakers in the model. The user can then adjust the delay of the identified loudspeaker in the detail window such than the first direct arrival the listener hears is from the loudspeaker closest to the audio source.

The concurrent display of both the model and coverage field in the modeling window, a response characteristic such as time response in the data window, and a property characteristic such as loudspeaker parameters in the detail window enables the user to quickly identify a potential problem, try various fixes, see the result of these fixes, and select the desired fix.

Removing objectionable time arrivals is another example where the concurrent display of the model, response, and property characteristics enables the user to quickly identify and correct a potential problem. Generally, arrivals that arrive more than 100 ms after the direct arrival and are more than 10 dB above the reverberant field may be noticed by the listener and may be unpleasant to the listener. The user can select an objectionable time arrival from the time response plot in the data window and see the path in the modeling window to identify the loudspeaker and surfaces associated with the selected path. The user can select one of the surfaces associated with the selected path and modify or change the material associated with the selected surface in the detail window and see the effect in the data window. The user may re-orient the loudspeaker by selecting the loudspeaker tab in the detail window and entering the changes in the detail window or the user may move the loudspeaker to a new location by dragging and dropping the loudspeaker in the modeling window.

FIG. **6*a* shows the data window with the MTF tab 626** selected. The Modulation Transfer Function (MTF) returns a normalized modulation preserved as a function of modulation frequency for a given octave band. A discussion of the MTF is presented in K. D. Jacob, "Development of a New Algorithm for Predicting the Speech Intelligibility of Sound Systems," presented at the 83$^{rd}$ Convention of the Audio Engineering Society, New York, N.Y. (1987), Houtgast, T. and Steeneken, H. J. M. "Evaluation of Speech Transmission Channels by Using Artificial Signals" Acoustica, Vol. 25, pp 355-367

(1971) and "Predicting Speech Intelligibility in Rooms from the Modulation Transfer Function. I. General Room Acoustics," Acoustica, Vol. 46, pp 60-72 (1980), and the international standard "Sound System Equipment—Part 16: Objective Rating of Speech Intelligibility by Speech Transmission Index, IEC 60268-16, which are each incorporated herein in their entirety. In FIG. 6, only the MTF for octave bands corresponding to 125 Hz 650, 1 kHz 660, and 8 kHz 670 are shown for clarity although other octave bands may be displayed. In an ideal situation, a MTF substantially equal to one indicates that modulation of the voice box of a human speaker generating the speech is substantially preserved and therefore the speech intelligibility should be ideal. In a real-world situation, however, the MTF may drop significantly below the ideal and indicate possible speech intelligibility problems.

Figure 6A:
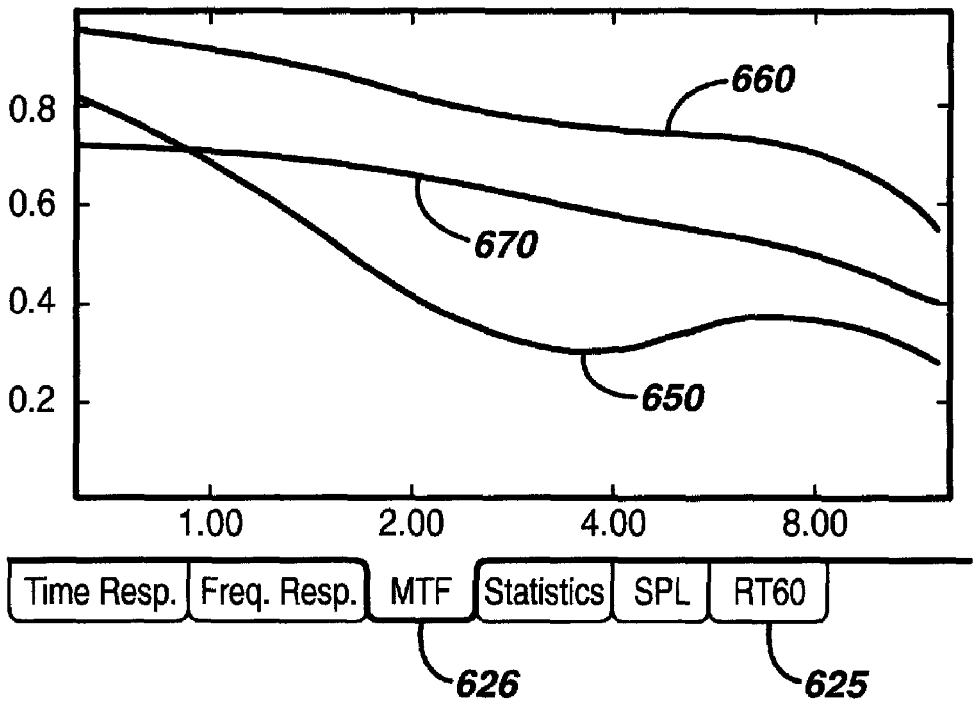
FIG. 6*a* illustrates a detailed view of the data window with an MTF tab selected.
Figure 6B:
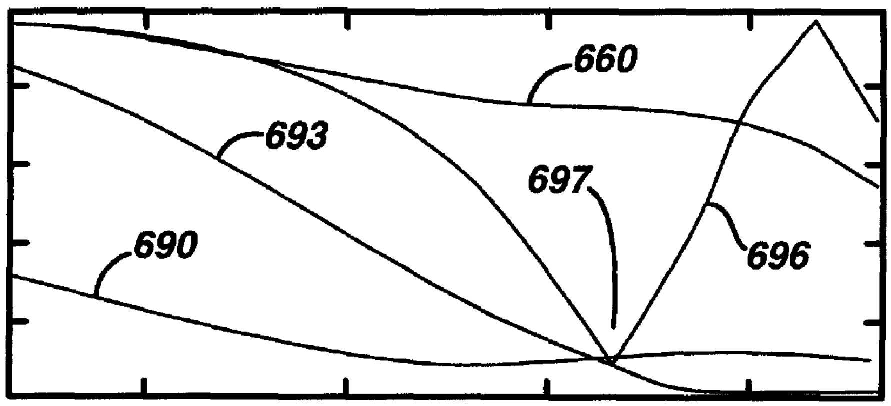
FIG. 6*b* displays exemplar MTF plots indicative of typical speech intelligibility problems.

FIG. 6*b* displays exemplar MTF plots that may indicate the source of a speech intelligibility problem. In FIG. 6*b*, the MTF corresponding to the 1 kHz MTF 660 shown in FIG. 6*a* is re-displayed to provide a comparison to the other MTF plots. The MTF labeled 690 in FIG. 6*b* illustrates an MTF that may be expected if background noise significantly affects the speech intelligibility of the modeled space. When background noise is a significant contributor to poor speech intelligibility, the MTF is significantly reduced independent of the modulation frequency as illustrated in FIG. 6*b* by comparing the MTF labeled 690 to the MTF labeled 660. When reverberation is a significant contributor to poor speech intelligibility, the MTF is reduced at higher modulation frequencies where the rate of reduction of the MTF increases as the reverberation times increase as illustrated by the MTF labeled 693 in FIG. 6*b*. The MTF labeled 696 in FIG. 6*b* illustrates an effect of late-arriving reflections on the MTF. A late-arriving reflection is manifested in the MTF by a notch 697 located at a modulation frequency that is inversely proportional to the time delay of the late-arriving reflection.

As FIG. 6*b* illustrates, background noise can have a significant impact on the speech intelligibility of a venue. The user may select from a library of standard noise profiles such as PNC or NC. The user may select a standard noise profile and adjust the overall gain on user-defined curves to match the estimated background noise level expected in a venue.

In addition to selecting a background noise profile from a library of standard noise profiles, the user may create or import a new background noise profile. The ability to create or import a new background noise profile may provide for a more realistic audio rendering by the audio player of the design model. If the design project involves a venue that is already built, the user can provide a background noise profile that was generated from a recording in the existing venue. If the design project involves a venue that has not completed construction, the user may record background noise at a similar venue, such as for example, an airport or train station that can provide a more realistic rendering to the user. In another example, a recording may be made of the "babble" generated by the conversations at adjacent tables in a restaurant to simulate a more realistic restaurant environment. Each background noise profile may be stored as a separate file by the design system.

Figure 7:
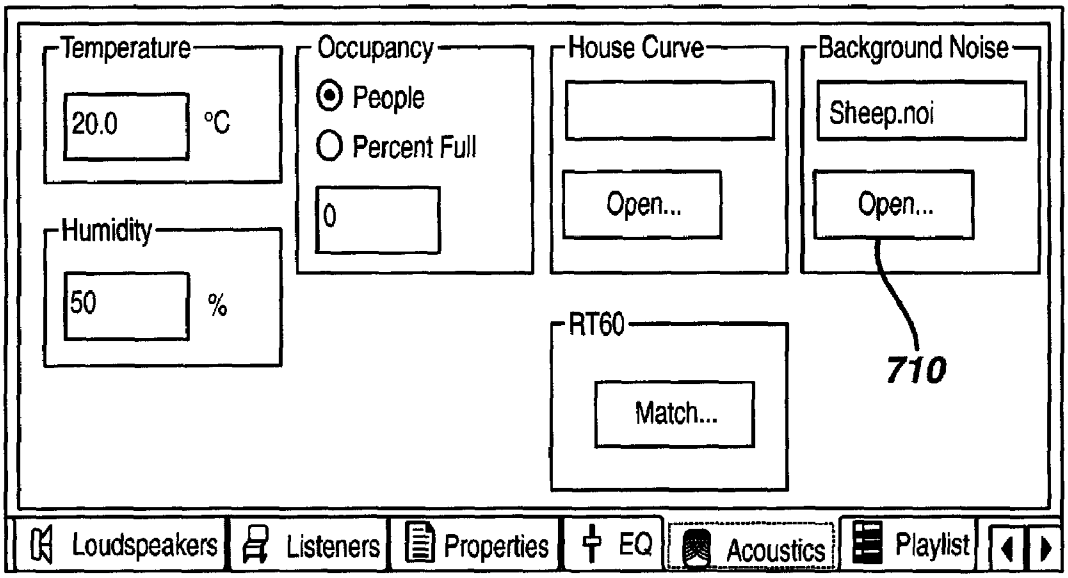
FIG. 7 illustrates an exemplar dialog box displaying room-level acoustic parameters used for sound system simulation.

FIG. 7 illustrates a detailed view of the detail window with the Acoustics tab selected. In FIG. 7, room-level parameters that affect the acoustics in the model such as temperature, humidity, and background noise, are grouped together and are editable by the user. A user control 710 such as a control button may be selected to select a background noise profile for the model. When the user selects the control 710, a profile edit window is displayed that allows the user to select and edit a noise profile.

Figure 8:
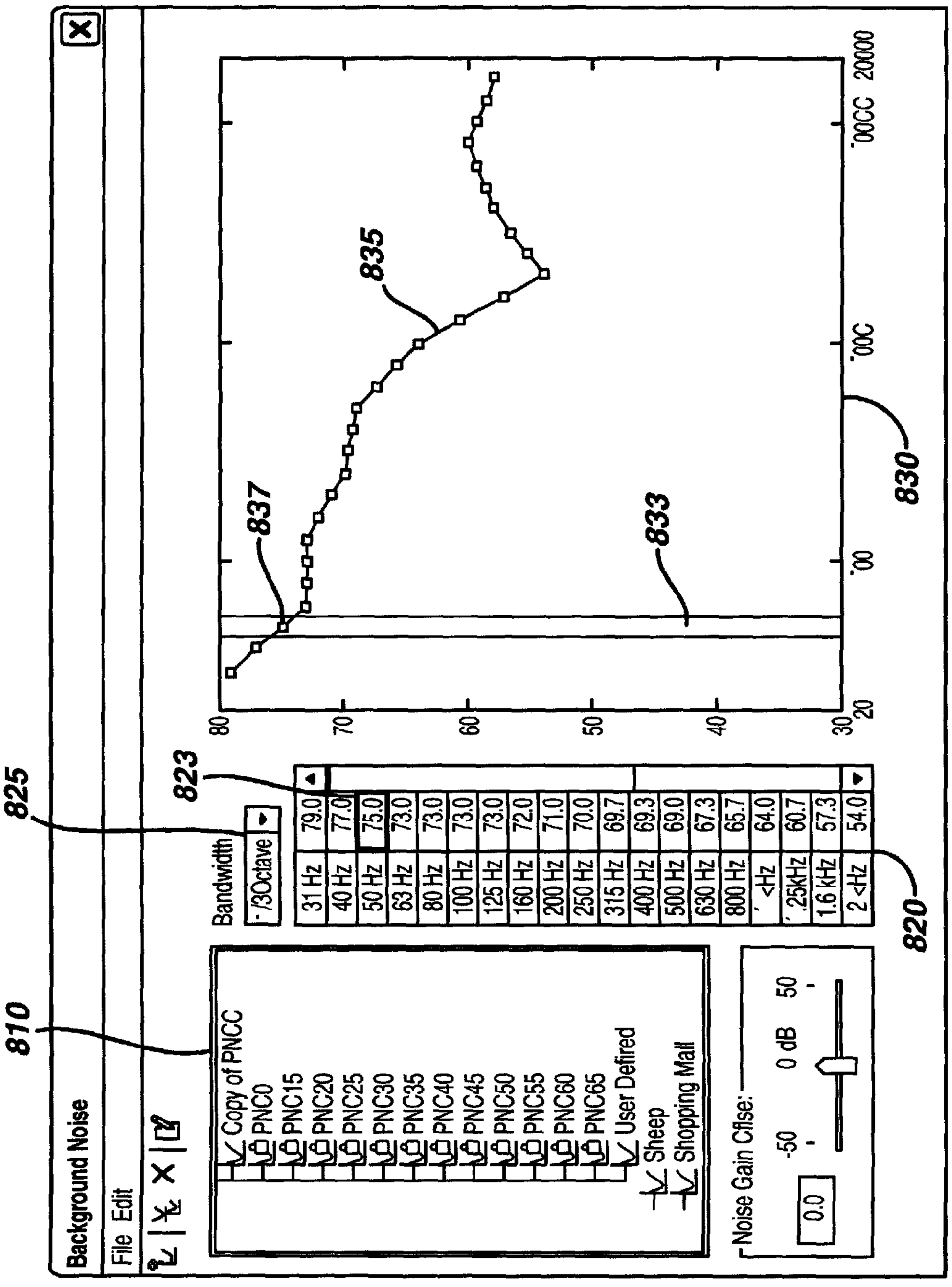
FIG. 8 illustrates a background noise profile edit window.

FIG. 8 shows a profile edit window that may be used to create or modify a background noise profile. The profile edit window includes noise directory 810 that allows the user to navigate and select the desired noise profile file. The user may select a noise profile from a library of noise profiles that include pre-determined standard noise profiles and custom noise profiles that were created and previously saved to the library. The pre-determined standard noise profiles may be locked to prevent the user from accidentally changing the standard noise profile but the user may create a copy of the standard noise profile, edit the copy, and save the edited profile under a new name. When the user selects a noise profile in the noise directory 810, the selected noise profile is highlighted and the selected noise profile is displayed in a list 820 and in a graph 830. The list 820 presents the level of the selected noise profile in each frequency band. A list control 825 allows the user to select the width of the frequency band. The user can edit the selected noise profile by selecting a frequency band and typing a new value in the selected band 823. The values presented in the list 820 are graphically displayed in graph 830 that displays a plot of the selected noise profile 835 as a function of frequency. The selected band 823 is displayed as a vertical bar 833 in the graph. The user can select a point 837 associated with the selected band 833 and drag the point 837 up or down to change the value of the selected noise profile for the selected band 833. When the user has finished editing the selected noise profile, the user clicks on the OK control and the user interface will prompt the user to save or cancel the edits.

Figure 9:
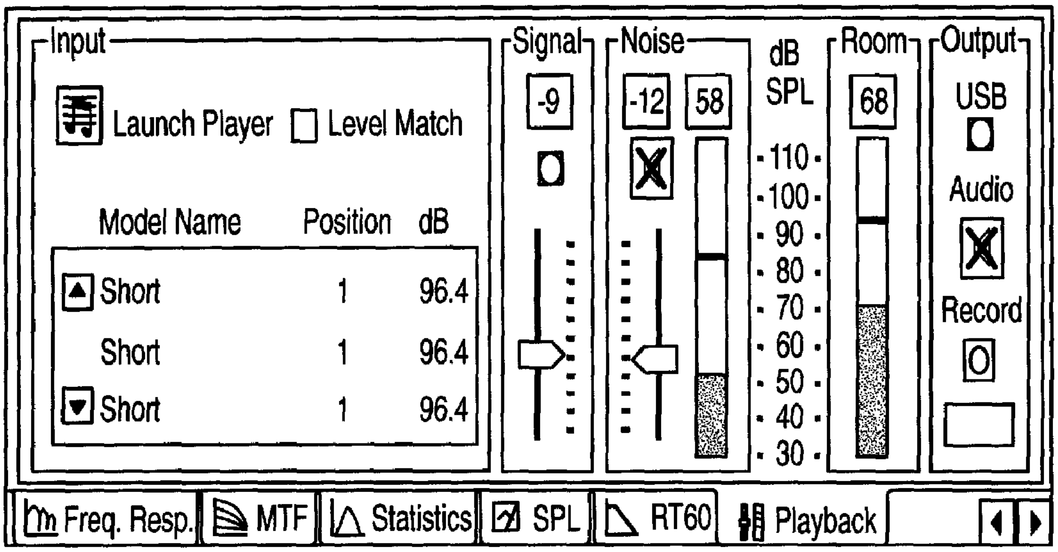
FIG. 9 illustrates a data window with a Playback tab selected.

FIG. 9 shows the data window with a Playback tab selected. The Playback tab allows the user to control the audio rendering of the simulated sound system and model. The user may direct the output of the audio rendering to an audio playback device, to an external port such as a USB port, or to a file such as a WAV or MP3 file for later playback. The user can set a level of the program signal and can set the level of the background noise independently of the program signal level. When the user adjusts the level of the background noise, the system may update and display a STI coverage map in the modeling window to allow the user to see the effect of varying noise levels on the STI coverage map.

In addition to seeing the effect of the background noise on the coverage map, the user can also hear the effect through the audio playback device. By playing an appropriate background noise through the audio player along with the program signal, the user experiences a more realistic simulation of the model. For example, if the model is of a check-in area of an airport, a background noise profile generated from a recording of a check-in area of an airport would provide a more realistic simulation than, for example, a standard pink noise profile. The user may record background noise at a similar venue if the modeled venue has not been built and process the recorded background noise into a format compatible with the simulation system. For example, the recorded background noise may be transformed into the frequency domain to generate the noise profile for the recorded background noise. The recorded background noise may be filtered and stored in a format compatible with the audio player. The filtering of the recorded background noise equalizes the recorded signal to compensate for any linear distortions introduced by the audio player. For example, the audio player may add 10 dB above 10 kHz and to compensate for the 10 dB boost, the recorded signal is equalized to reduce the signal by 10 dB above 10 kHz such that the rendered audio playback reduces linear distortions introduced by the audio player. The generated profile and filtered recording are stored in the background noise library. When the user selects the noise profile, both the noise profile and filtered recording are loaded into the model. The noise profile is used to calculate, for example, the STI coverage. The filtered recording is played through the audio player when selected by the user.

Embodiments of the systems and methods described above comprise computer components and computer-implemented steps that will be apparent to those skilled in the art. For example, it should be understood by one of skill in the art that portions of the audio engine, model manager, user interface, and audio player may be implemented as computer-implemented steps stored as computer-executable instructions on a computer-readable medium such as, for example, floppy disks, hard disks, optical disks, Flash ROMS, nonvolatile ROM, flash drives, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. An audio simulation system comprising:

a computer including a processor and a storage device, the storage device storing a background noise library, the background noise library including at least one user-defined background noise file including a noise profile portion and a background noise signal representing an acoustic signal of the background noise, the storage device also storing instructions operable on the processor, the instructions comprising a model manager routine that causes the processor to enable a user to build a 3-dimensional model of a venue and place and aim one or more loudspeakers in the model;

an audio engine routine that causes the processor to estimate a speech intelligibility coverage pattern in a portion of the venue based on at least one acoustic characteristic of a component of the model including the noise profile portion of the background noise file; and an audio player routine that causes the processor to:

generate at least two acoustic signals simulating an audio program played over the one or more loudspeakers in the model, each of the at least two acoustic signals including an audio program signal and the background noise signal of the background noise file simulating a background noise; and adjust a level of the background noise signal independently of a level of the audio program signal.

2. The audio simulation system of claim 1 further comprising an audio output device, wherein the audio player routine further causes the processor to equalize the background noise signal to reduce linear distortions introduced by the audio output device.

3. The audio simulation system of claim 1 wherein the background noise signal is recorded at the venue modeled by the simulation system.

4. The audio simulation system of claim 1 wherein the background noise signal is recorded at a venue similar to the venue modeled by the simulation system.

5. The audio simulation system of claim 1 wherein the audio engine routine further causes the processor to automatically update the speech intelligibility coverage pattern to reflect the independently adjusted background noise signal relative to the audio program signal.

6. The audio simulation system of claim 1 further comprising a profile editor routine that causes the processor to allow a user to graphically edit the noise profile portion of the user-defined background noise file.

7. An audio simulation method comprising:

in an audio simulation system comprising a computer including a processor and a storage device, the storage device storing routines operable on the processor to implement a model manager, an audio engine, and an audio player and a background noise library including at least one user-defined background noise file including a noise profile portion and a background noise signal representing an acoustic signal of the background noise, building a model of a venue in the audio simulation system, the model including a sound system;

selecting a location in the model;

estimating a speech intelligibility coverage pattern in a portion of the venue based on at least one acoustic characteristic of a component of the model including the noise profile portion of the background noise file;

generating at least two acoustic signals simulating an audio program played over the sound system in the model at the selected location, each of the at least two acoustic signals including an audio program signal and a background noise signal; and adjusting a level of the background noise signal independently of the audio program signal.

8. The audio simulation method of claim 7 further comprising selecting the background noise signal based on the venue.

9. The audio simulation method of claim 7 further comprising:

recording a background noise at an existing venue;

equalizing the recorded background noise to reduce linear distortions introduced by an audio output device; and saving the equalized background noise in a file, the file part of the library of background noise files selectable by the user.

10. The audio simulation system of claim 7 further comprising editing the background noise signal.

11. A computer-readable medium storing a background noise library including at least one user-defined background noise file including a noise profile portion and a background noise signal representing an acoustic signal of the background noise and computer-executable instructions for causing a computer comprising a processor to:

implement an audio simulation system including a model manager routine, an audio engine routine, and an audio player routine;

build a model of a venue in the audio simulation system, the model including a sound system;

select a location in the model;

estimate a speech intelligibility coverage pattern in a portion of the venue based on at least one acoustic characteristic of a component of the model including the noise profile portion of the background noise file;

generate at least two acoustic signals simulating an audio program played over the sound system in the model at the selected location, each of the at least two acoustic signals including an audio program signal and a background noise signal and adjust a level of the background noise signal independently of the audio program signal.

* * * * *